G. S. STRONG.
Earth-Auger.
No. 162,966. Patented May 4, 1875.
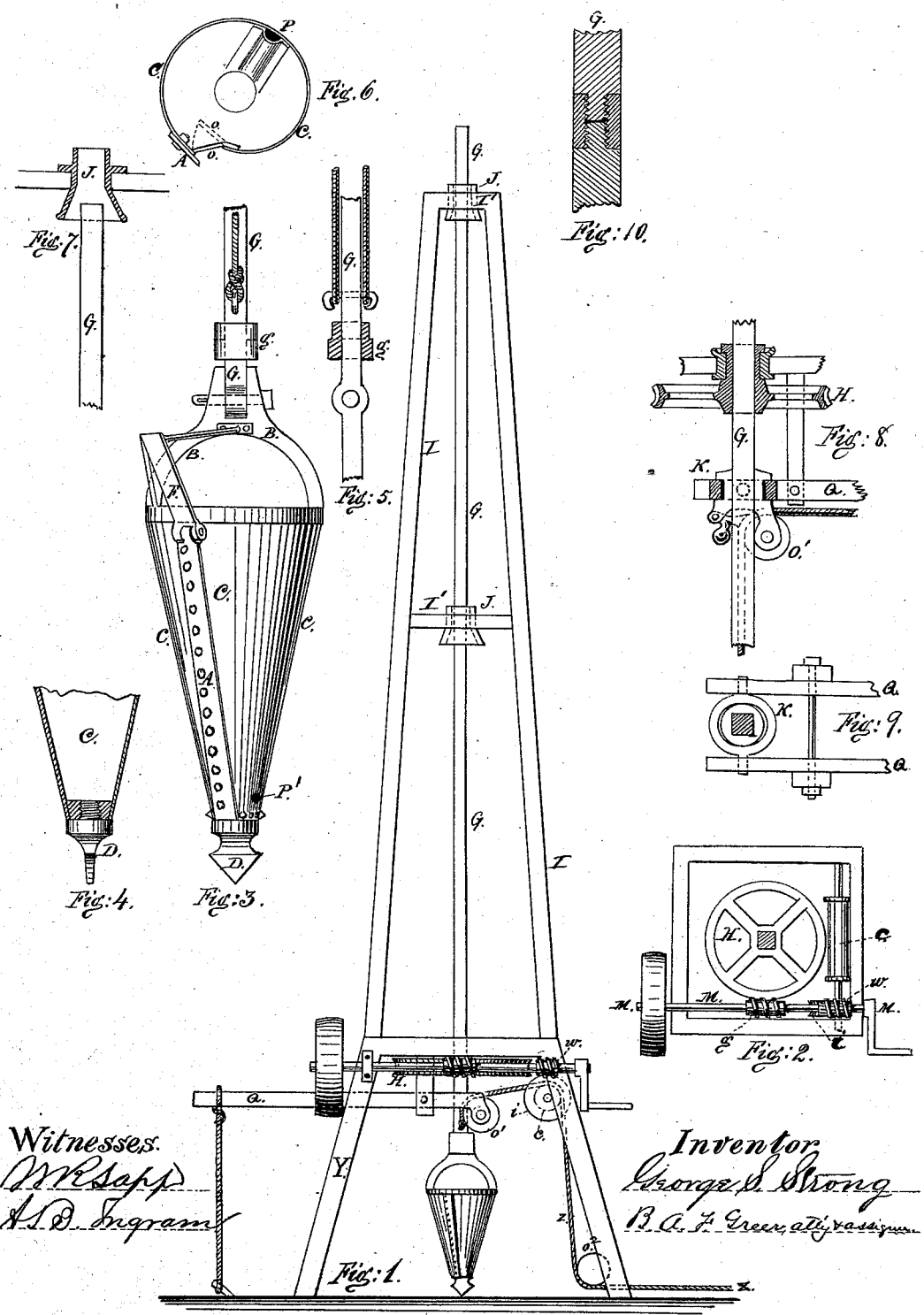

UNITED STATES PATENT OFFICE.

GEORGE S. STRONG, OF MOUNT VERNON, OHIO, ASSIGNOR OF ONE-HALF HIS RIGHT TO BENJAMIN A. F. GREER, OF SAME PLACE.

IMPROVEMENT IN EARTH-AUGERS.

Specification forming part of Letters Patent No. 162,966, dated May 4, 1875; application filed January 12, 1874.

*To all whom it may concern:*

Be it known that I, GEORGE SIMPSON STRONG, of the city of Mount Vernon, county of Knox and State of Ohio, have invented a new and Improved Machine for Boring Wells, Post-Holes, and for making air-shafts for mines and other purposes; and I do hereby declare that the following is a true and exact description of the same, reference being had to the accompanying drawing and to the letters of reference thereon.

Figure 1 shows in an elevation the total arrangement of my invention, with the auger above ground and ready for operation.

The other figures show the various details drawn to a larger scale.

The auger is represented in Figs. 3, 4, and 6, where C shows the outer shell, and A the blade sharpened at the edge and bolted to the shell. This blade may be made straight or in a spiral form. A flexible strip, O, Fig. 6, is fastened to the inside of the shell usually pressing toward the blade, but moving to the center of the cone, opening like a hinged door or valve whenever the material to be removed forces its way into the auger, and closing when the auger is raised, thus retaining its contents. This blade A can be extended by means of another hinged blade, F, Fig. 3, braced toward the bail and outside of the auger. This is done to form a reamer for the purpose of drilling holes of a size larger than the upper diameter of the auger. A hollow pipe or passage, P, Fig. 6, is provided at the inner side of the cone running the whole length of the auger, communicating with a space below the auger by a hole, P', Fig. 3, providing by these means a communication between the atmosphere and the space below the cone, that no vacuum may be formed when the auger is withdrawn retarding such withdrawal. To the bottom of the auger is attached, in the manner shown in Fig. 4, by screw-thread, a drill-point, which may be renewed or removed for repair without disabling the entire auger. By means of this drill-point rocks may be penetrated and a material advantage gained over other earth-boring devices hitherto invented, as, by means of mechanism hereafter described, my invention may be used as a regular chuck or rotary drill.

The auger and drill are operated by means of the square shaft G connected to it through a bail, B, with a hinge, as shown in Fig. 3, so that the auger may be turned over on its end when drawn from the earth for the purpose of emptying its contents for removal. While operating this bail is rigidly connected with the shaft by means of a coupling, $g$, which falls or slips over the two prongs of the hinge-joint, but is pulled up when it is desired to turn the auger on end. This coupling is shown by Figs. 3, 5, and 1. This upright shaft G is made in one piece usually, but for deeper wells it is coupled by a square nut the size of the shaft in the manner shown in Fig. 11. That the shaft may be guided in its upward course when the auger is withdrawn, a very light frame-work, of wood or other material, I, supports at intervals guides J, (shown in Figs. 1 and 7,) the guide being widened at the bottom that the shaft may be sure to enter at all times. The auger is revolved by means of the mechanism shown in Figs. 1, 2, and 9. A worm-gear, H, is supported in a bearing at the upper part of the frame-work Y; and this gear having a square hole loosely fitting the square shaft G, whenever it is turned by means of the worm on the shaft M, will cause the auger to revolve. This shaft M can be operated either by crank through man-power at one or both ends, or by animal or steam power by the use of universal coupling or pulley. Although but one method of turning the auger is here shown, yet it is evident that a great many other devices accomplish the same purpose. The auger is raised by means of two ropes or equivalents, which are attached to the lower end of shaft G, Fig. 5; thence run up on opposite sides, over the pulleys $O^1$ $O^1$, Figs. 1 and 9, and over the drum $c'$, Figs. 1 and 2; and thence downward over other pulleys, $O^2$, in any direction desired. These ropes $Z'$ $Z'$ can be operated by man or animal power by direct pull at X, or by the same motive power which operates the auger through means of the worm $w$ and worm-gear $i$ on the small drum, over which the rope is passed in several turns in the manner of winches, the worm being arranged to slip in and out of gear.

While operating the drill-point at times may meet obstructions, and in order to be able to go on it would be necessary to raise the auger a small amount. To accomplish this point without having to disarrange the rope, which had been fastened to the revolving shaft, the pulleys $O^1 O^1$ are not hung rigidly, but are carried by one end of the levers Q Q, which, moving on a fulcrum, allow the pulleys to rise or fall a small amount when desired, but yet are usually kept stationary. These pulleys are held in bearings, which can revolve with the shaft, but are forced up and down by the levers through a collar, K, allowing the necessary freedom of motion. (See Fig. 10.) To this bearing is also attached a rope-grapple, to prevent the rope from falling into the well when detached.

It will be observed that when the mechanism moves the levers Q Q the auger receives a vertical motion, while its rotary motion is continued or not at pleasure, and by these means making the auger-point act as a combined rotary and chuck drill.

What I claim as my invention, and desire to secure by Letters Patent, is—

1. The combination, in an earth-boring auger, of the long hollow cone-shaped auger C B, straight cutting-blade A, removable point D, internal inwardly-opening valve O, air-passage P P', and extension-blade F, all constructed, arranged, and adapted to operate substantially as and for the purposes described.

2. In combination with the auger C and blade A, constructed as described, the removable independent extension-blade F, hinged to the blade A, and extending and braced at an angle outward from the top rim of the auger C, substantially as and for the purposes described.

3. In combination with the auger C, provided with the bail B, the square shaft G, hinged to the bail B, and coupling $g$, sliding loosely on the shaft G, and fitting over the top portion of the bail B, whereby the shaft is locked in a vertical position to the auger, substantially as and for the purposes described.

4. The supporting frame-work I Y, provided at intervals with cross-bars I', which contain flaring mouth-shaped guides J, substantially as described.

5. The mechanism for raising the auger, consisting of the two ropes Z Z, attached to the lower end at each side of the shaft G, pulleys $O^1 O^2$, drum $c$, worm $w$, and worm-gear $i$, all constructed, arranged, and adapted to operate substantially as and for the purposes described.

6. As an additional means for raising the auger a slight distance when desired, the levers or frame Q Q, pivoted or fulcrumed to the frame-work Y, and provided at their ends with pulleys $O^1$, held in bearings which revolve with the shaft, but are forced up or down by the levers Q through a collar, K, substantially as described.

7. The machine for boring wells, &c., herein described, consisting of the cone-shaped auger C D, shaft G, hinged to the bail B of the auger C, supporting-frame I I' Y, operating mechanism H M $g$, guides J, raising mechanism Z Z $c$, $O^1 O^2$ K, all constructed, arranged, and adapted to operate substantially as and for the purposes described.

8. In combination with the cone-shaped auger C, provided with the blade A and air-passage P P', the long slot in the side of the auger, and elastic inwardly-opening valve O, substantially as and for the purposes described.

GEORGE SIMPSON STRONG.

Witnesses:
WILLIAM R. SAPP,
ALEXANDER B. INGRAM.